US006439532B1

(12) United States Patent
Yu

(10) Patent No.: US 6,439,532 B1
(45) Date of Patent: Aug. 27, 2002

(54) GUITAR STAND

(76) Inventor: Ming-Ti Yu, 122-5, Jun Liao Rd., Feng Yuan, Taichung Hsien (TW)

( * ) Notice: Subject to any disclaimer, the term of this patent is extended or adjusted under 35 U.S.C. 154(b) by 0 days.

(21) Appl. No.: 09/738,658

(22) Filed: Dec. 13, 2000

(51) Int. Cl.[7] .......................... G10G 5/00; F16M 11/38; A47F 5/00

(52) U.S. Cl. ..................... 248/443; 248/166; 248/122.1

(58) Field of Search ................................. 248/166, 443, 248/122.1, 302; 84/327

(56) References Cited

U.S. PATENT DOCUMENTS 1,170,684 A * 2/1916 Schlieckert ................. 248/327
3,958,786 A * 5/1976 Mann ......................... 248/176
4,691,610 A * 9/1987 Gilbert ........................ 84/327
5,372,346 A * 12/1994 Upchurch ................... 248/304
5,375,497 A * 12/1994 Pirchio ........................ 84/327
5,664,756 A * 9/1997 Liao ........................... 248/443
5,713,547 A * 2/1998 Yu ............................. 248/166
5,836,552 A * 11/1998 Yu ............................. 248/166
5,852,250 A * 12/1998 Cha ............................ 84/327
5,957,417 A * 9/1999 Yu ............................. 248/166
5,959,225 A * 9/1999 Hsu ............................ 84/327
6,005,176 A * 12/1999 Yu ............................. 84/327

* cited by examiner

*Primary Examiner*—Leslie A. Braun
*Assistant Examiner*—Amy J. Sterling

(57) ABSTRACT

A guitar stand has a first leg, a second leg, a first bracket disposed on the first leg, a second bracket disposed on the second leg, a third leg, a connecting seat connected to the first leg, the second leg, and the third leg, a connector surrounding an upper end of the third leg, a tube inserted through the collar and inserted in the third leg, and a foldable support frame disposed on the tube. The foldable support frame has a support block and a fastening device.

2 Claims, 13 Drawing Sheets

GUITAR STAND

BACKGROUND OF THE INVENTION

The invention relates to a guitar stand. More particularly, the invention relates to a guitar stand which can be operated easily.

U.S. Pat. No. 5,713,547 has disclosed a guitar stand which has a main hollow rod, a first hollow leg, a second hollow leg, a first brace, a second brace, a first bracket, and a second bracket. A pivot means fastens the first hollow leg and the second hollow leg on the main hollow rod pivotally. A hollow upper block is disposed on top of the main hollow rod. The pivot means has a lobe, a transverse plate and a longitudinal plate which is disposed on top of the transverse plate. A main hollow rod has a lobe disposed on an upper portion of the main hollow rod. A circular hole and a curved hole are formed on the main hollow rod. A hollow upper block has a lower protrusion inserted in an upper end of the main hollow rod. A first and a second round cushions are disposed adjacent to a first and a second sides of the hollow upper block, respectively, The first round cushion has a first center hole. The second round cushion has a second center hole. A first bolt passes through the first center hole to fasten the first round cushion on the hollow upper block. A second bolt passes through the second center hole to fasten the second round cushion on the hollow upper block. A longitudinal plate is disposed on a top of the transverse plate. The longitudinal plate has an upper hole to match the corresponding circular hole and a lower hole to match the corresponding curved hole. A first fastening member passes through the circular hole and the upper hole and a second fastening member passes through the lower hole and the curved hole to fasten the lobe and the longitudinal plate together. A first and a second joints are disposed on the first and the second hollow legs, respectively. Each of the first and the second joints has a threaded lower portion inserted in a top interior of the corresponding hollow leg, an annular flange abutting the threaded lower portion, and a top recess to receive the transverse plate. A bevel is disposed beneath the top recess. A notch is formed on a top rim of the first hollow leg. A third and a fourth fastening members fasten the first and the second joints on the transverse plate. The first brace is fastened on a lower portion of the first hollow leg. The second brace is fastened on a lower portion of the second hollow leg. A first hook extends from a top end of the first bracket to be inserted in the first brace. A second hook extends from a top end of the second bracket to be inserted in the second brace.

SUMMARY OF THE INVENTION

An object of the present invention is to provide a guitar stand which can be operated easily.

Yet another object of the present invention is to provide a guitar stand which can be folded easily.

Accordingly, a guitar stand comprises a first leg, a second leg, a first bracket, a second bracket, a third leg, a connecting seat, a connector, a tube, and a foldable support frame. The third leg has an upper end. The first leg has a first end joint having a first slot. The second leg has a second end joint having a second slot. The first bracket has a first mount disposed on the first leg. The second bracket has a second mount disposed on the second leg. The connecting seat has a U-shaped frame disposed on the third leg, the U-shaped frame having a threaded through aperture, a T-shaped plate inserted in the U-shaped frame, the first slot, and the second slot, and a screw rod fastening the T-shaped plate and the U-shaped frame via the threaded through aperture. The connector has a collar receiving the upper end of the third leg, a T-shaped block connected to the collar, and two annular cushions disposed on the T-shaped block. The collar has a round hole receiving a threaded button. The tube is inserted through the collar and inserted in the third leg. The foldable support frame is disposed on the tube.

DETAILED DESCRIPTION OF THE INVENTION

Figure 1:
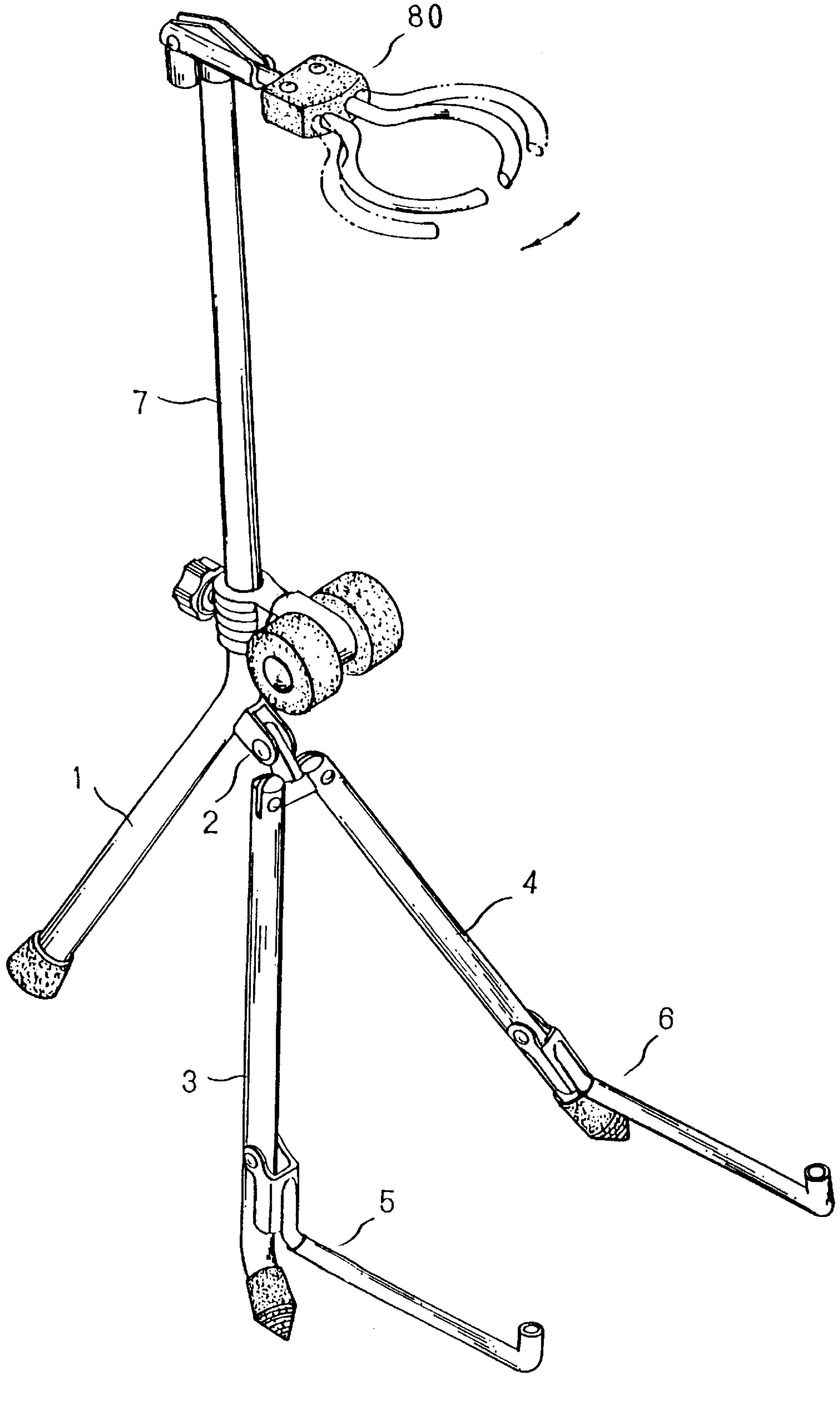
FIG. 1 is a perspective assembly view of a guitar stand of a first preferred embodiment in accordance with the present invention.
Figure 2:
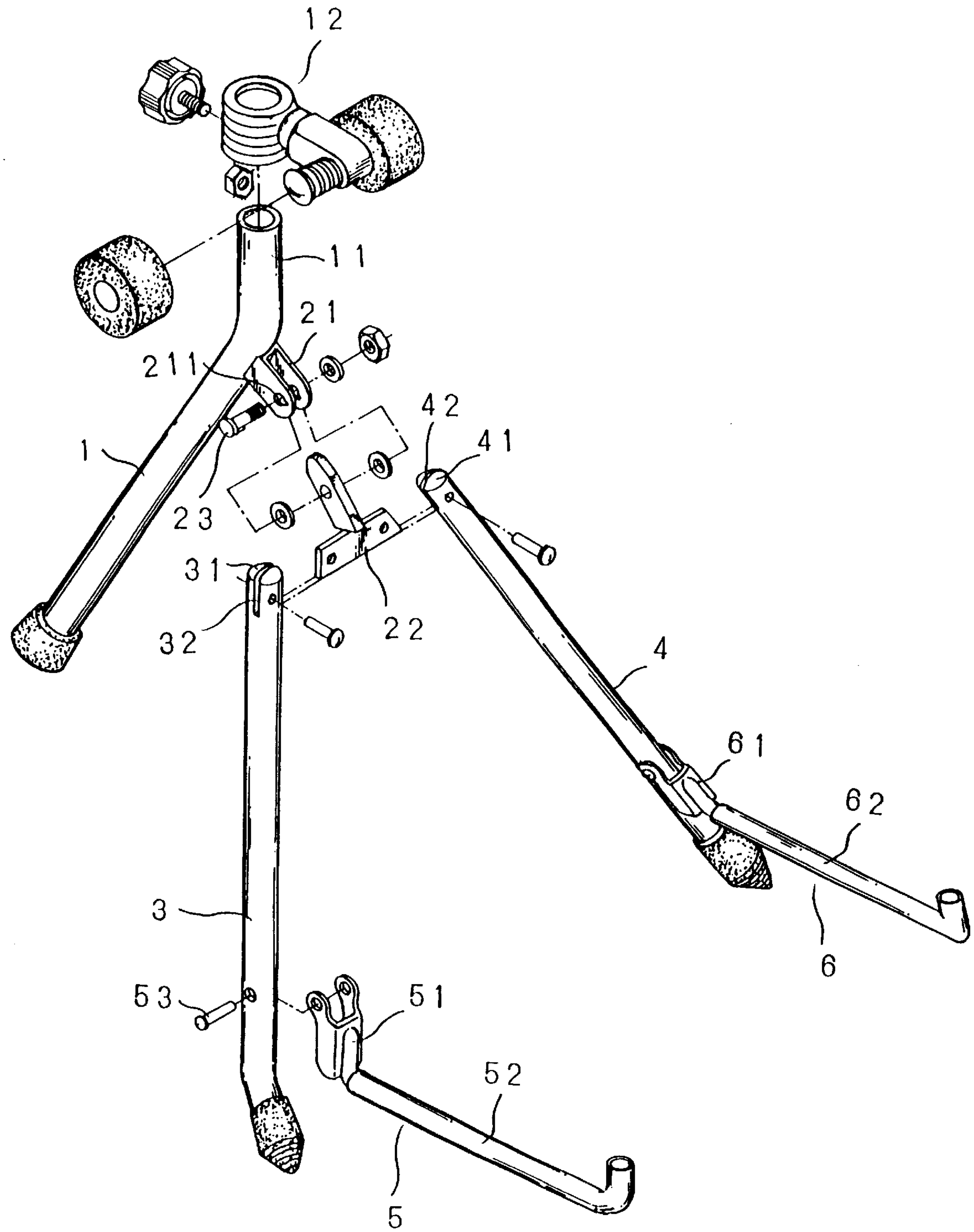
FIG. 2 is a perspective exploded view of a first leg, a second leg, a first bracket, a second bracket, a third leg, a connecting seat, and a connector of a first preferred embodiment in accordance with the present invention.
Figure 3:
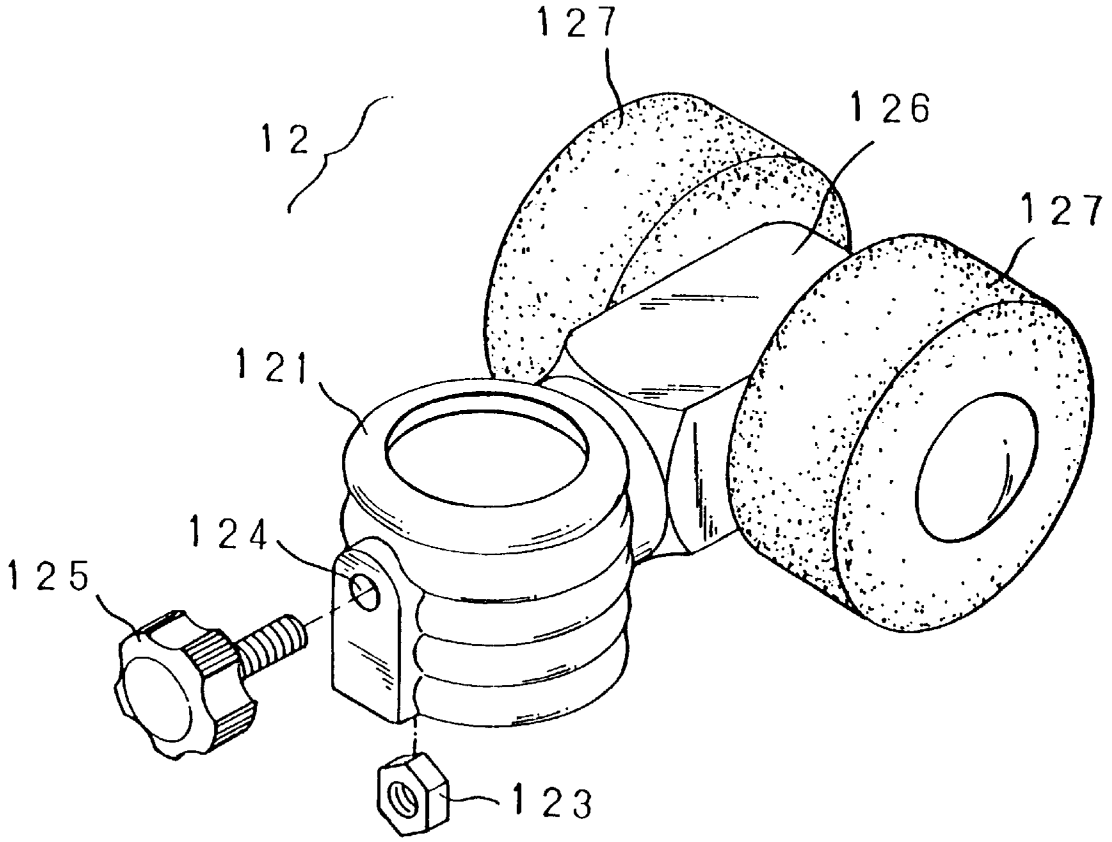
FIG. 3 is a perspective view of a connector of a first preferred embodiment in accordance with the present invention.
Figure 4:
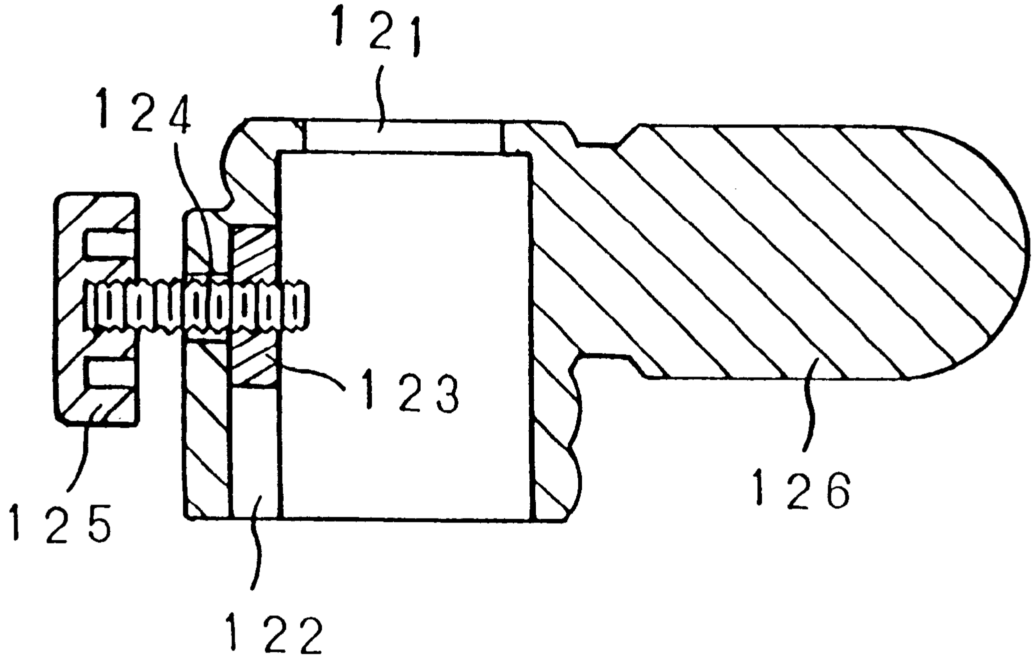
FIG. 4 is a sectional view of a connector of a first preferred embodiment in accordance with the present invention.
Figure 5:
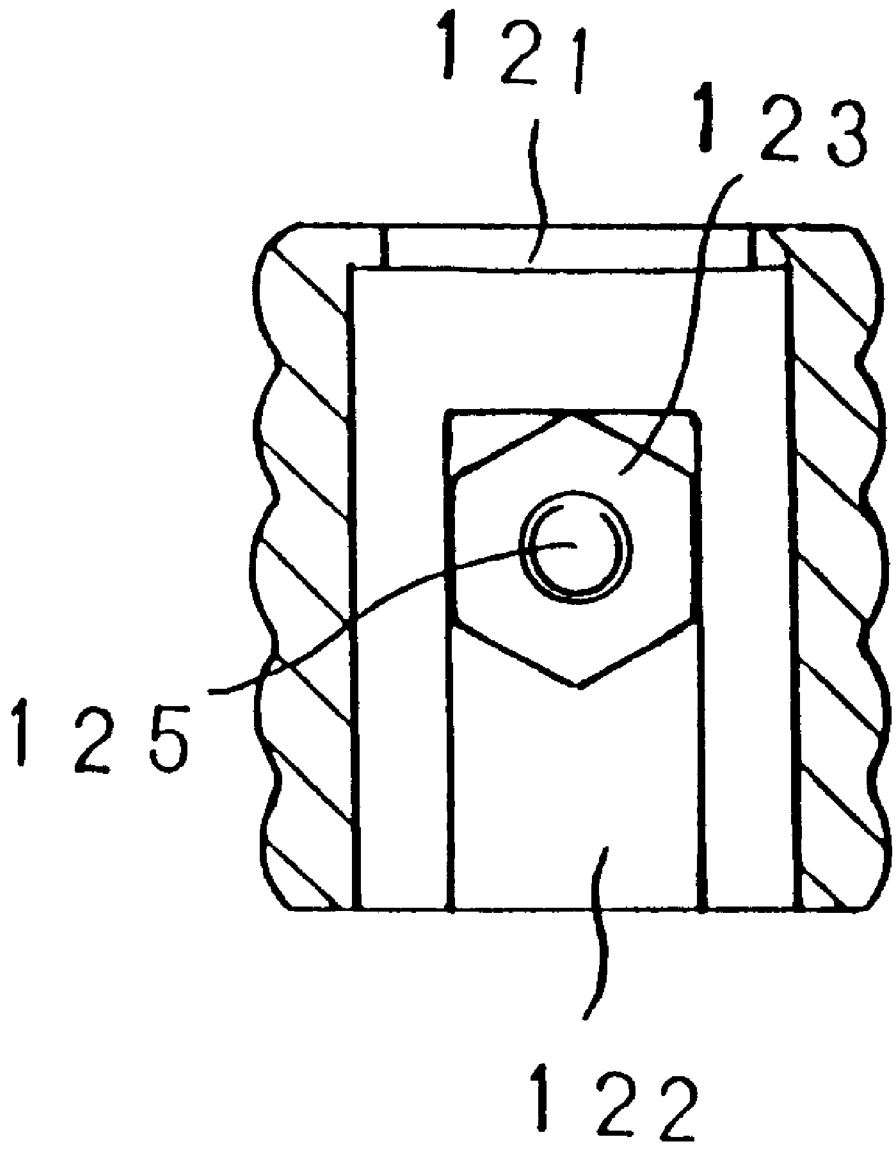
FIG. 5 is another sectional view of a connector of a first preferred embodiment in accordance with the present invention.
Figure 6:
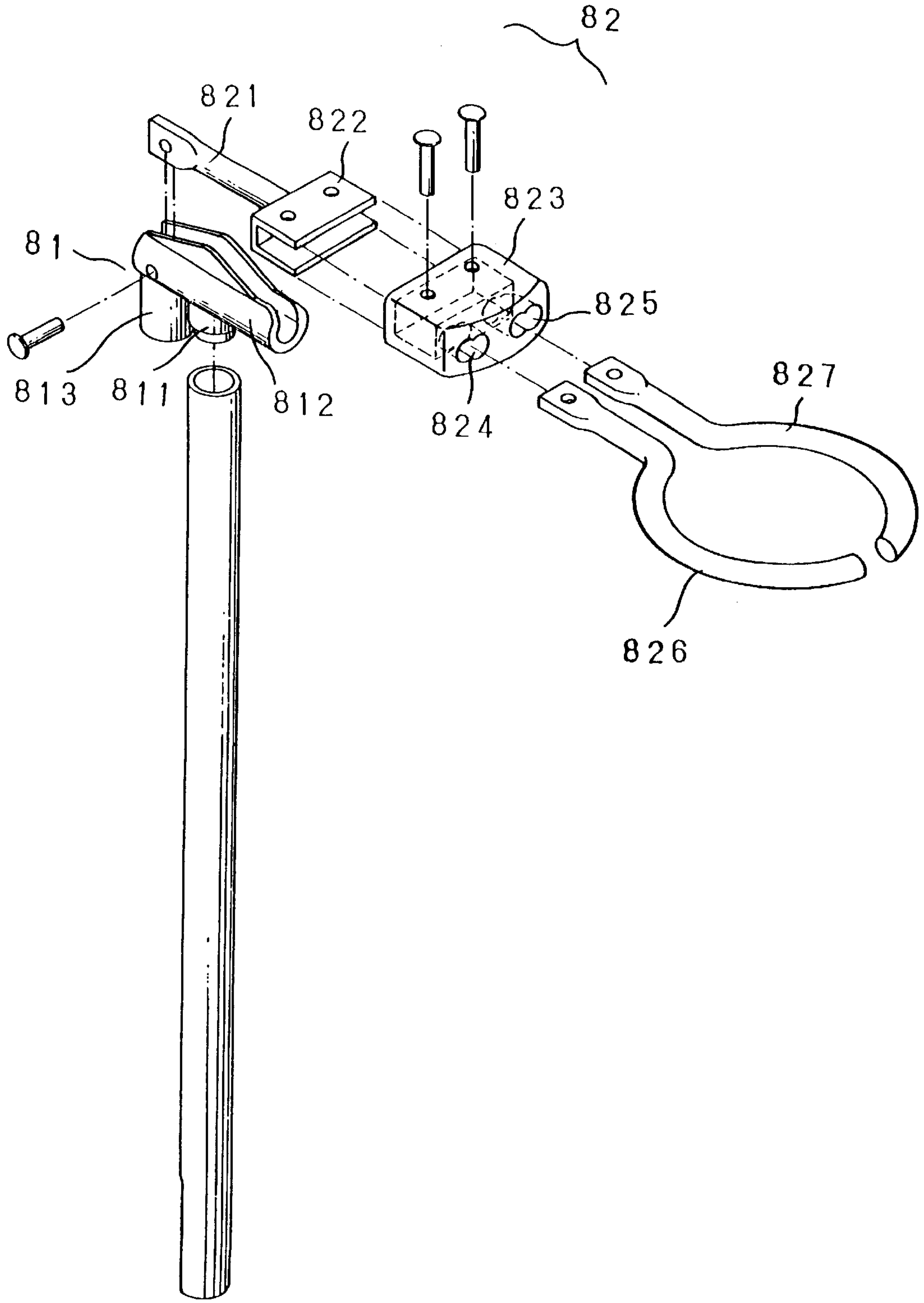
FIG. 6 is a perspective exploded view of a tube, and a foldable support frame of a first preferred embodiment in accordance with the present invention.
Figure 7:
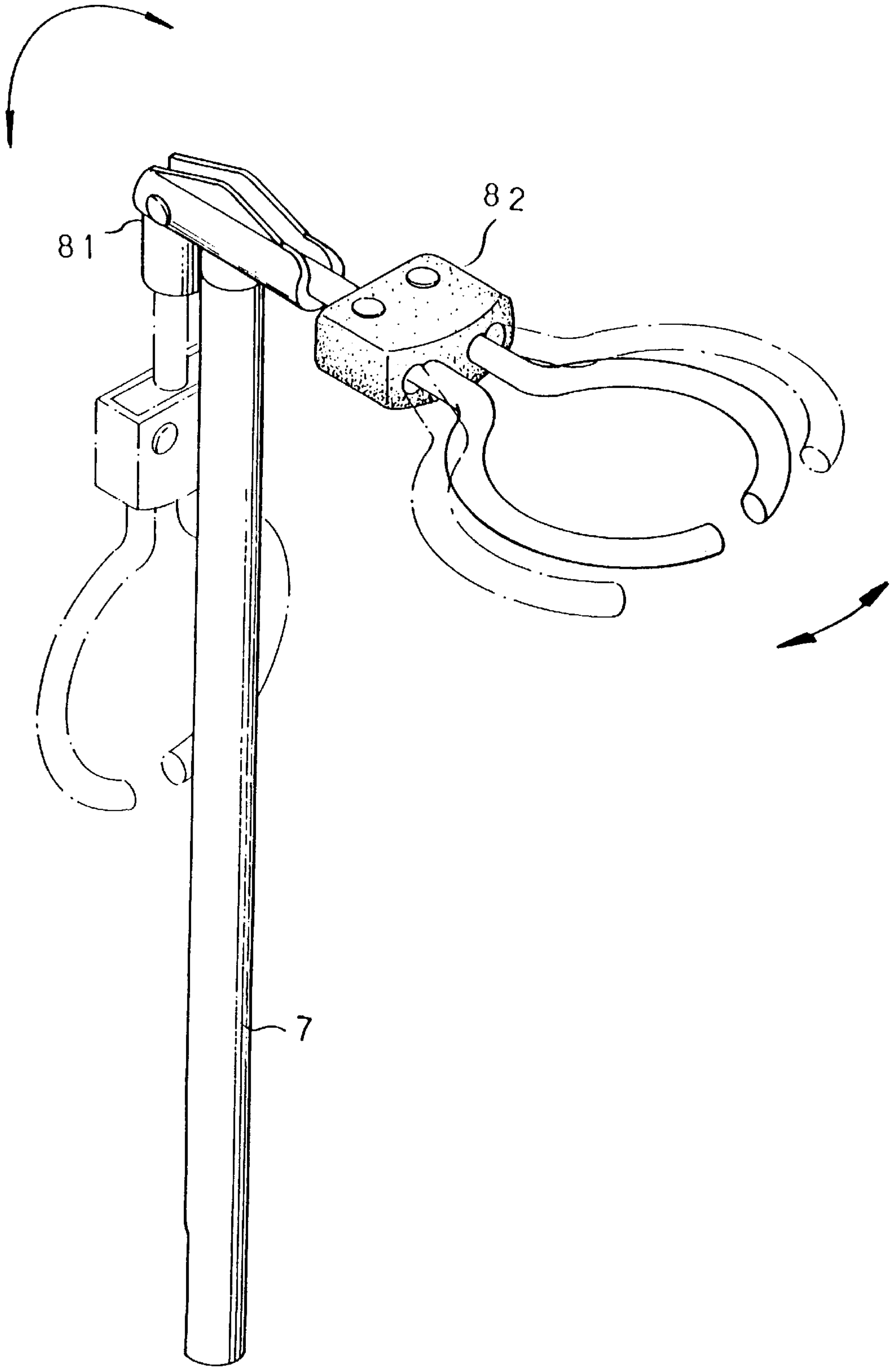
FIG. 7 is a perspective assembly view of FIG. 6.
Figure 8:
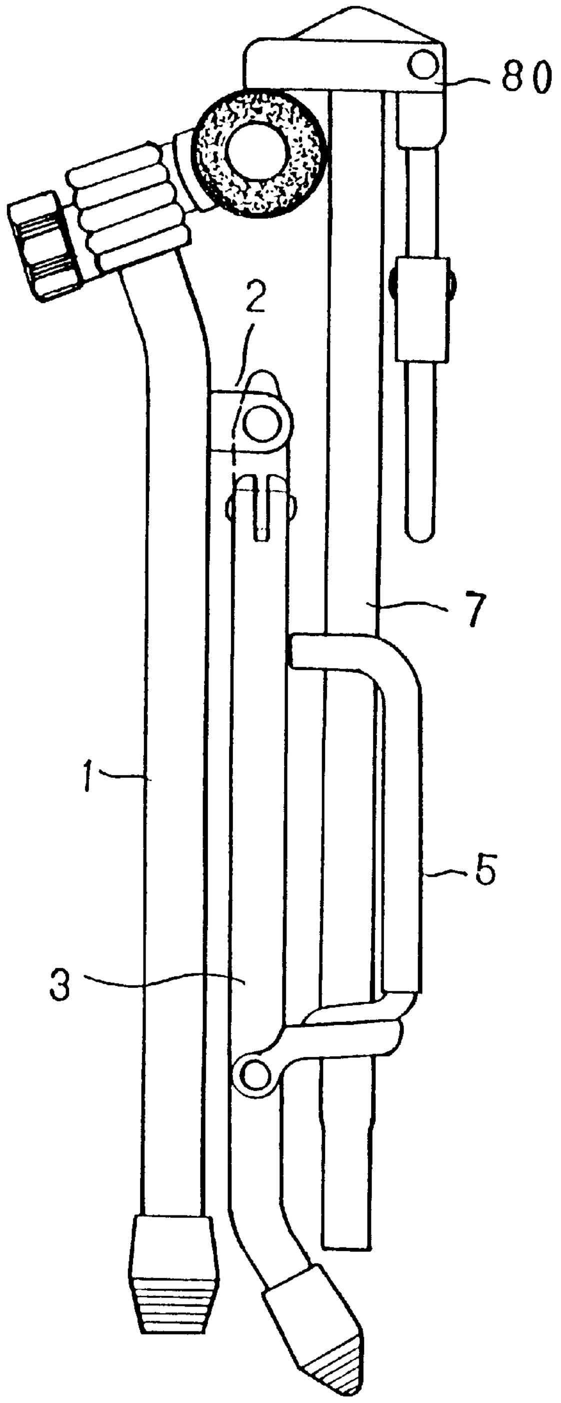
FIG. 8 is a schematic view illustrating a folding of a guitar stand of a first preferred embodiment in accordance with the present invention.

Referring to FIGS. 1 to 8, a guitar stand comprises a first leg 3, a second leg 4, a first bracket 5, a second bracket 6, a third leg 1, a connecting seat 2, a connector 12, a tube 7, and a foldable support frame 80.

The third leg 1 has an upper end 11.

The first leg 3 has a first end joint 31 having a first slot 32.

The second leg 4 has a second end joint 41 having a second slot 42.

The first bracket 5 has a first mount 51 disposed on the first leg 3. A rivet 53 fastens the first mount 51 on the first leg 3.

The second bracket 6 has a second mount 61 disposed on the second leg 4.

The connecting seat 2 has a U-shaped frame 21 disposed on the third leg 1, the U-shaped frame 21 having a threaded through aperture 211, a T-shaped plate 22 inserted in the U-shaped frame 21, the first slot 32*t* and the second slot 42, and a screw rod 23 fastening the T-shaped plate 22 and the U-shaped frame 21 via the threaded through aperture 211.

The connector 12 has a collar 121 receiving the upper end 11 of the third leg 1, a T-shaped block 126 connected to the collar 121, and two annular cushions 127 disposed on the T-shaped block 126.

The collar 121 has a channel 122 receiving a nut 123 and a round hole 124 matching the nut 123 to receive a threaded button 125.

The tube 7 is inserted through the collar 121 and inserted in the third leg 1.

The foldable support frame 80 has a support block 81 and a fastening device 82.

The support block 81 has an insertion post 811 inserted in the tube 7, a sleeve 813, and a shaft socket 812.

The fastening device 82 has a shaft 821 inserted, in the shaft socket 812, a U-shaped plug 822 disposed on the shaft 821, an oblong socket 823 receiving the U-shaped plug 822, the oblong socket 823 having a first oblong hole 824 and a second oblong hole 825, a first arc plate 826 inserted through the first oblong hole 824, and a second arc plate 827 inserted through the second oblong hole 825.

Figure 9:
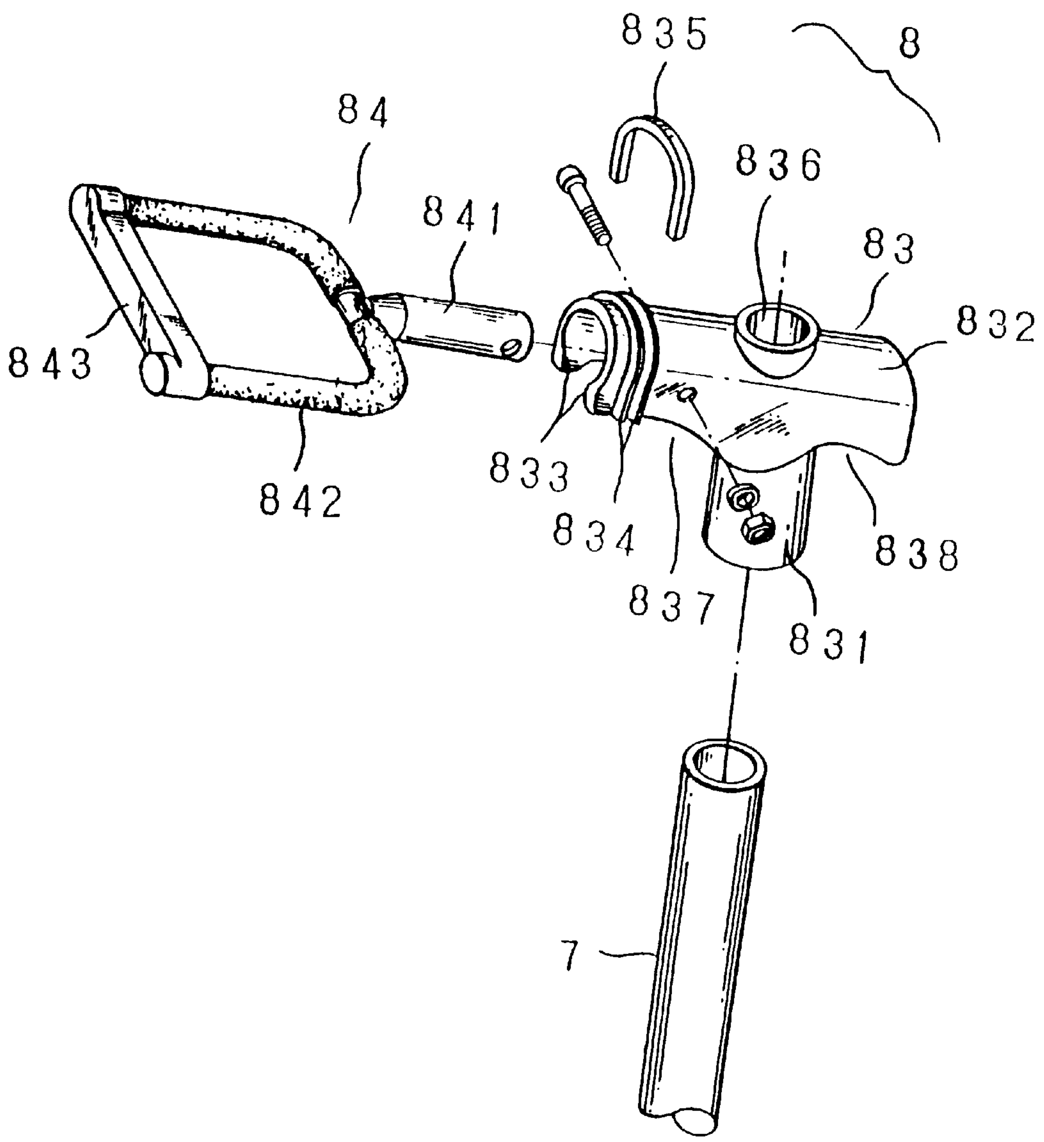
FIG. 9 is a perspective exploded view of a tube, and a foldable support frame of a second preferred embodiment in accordance with the present invention.
Figure 10:
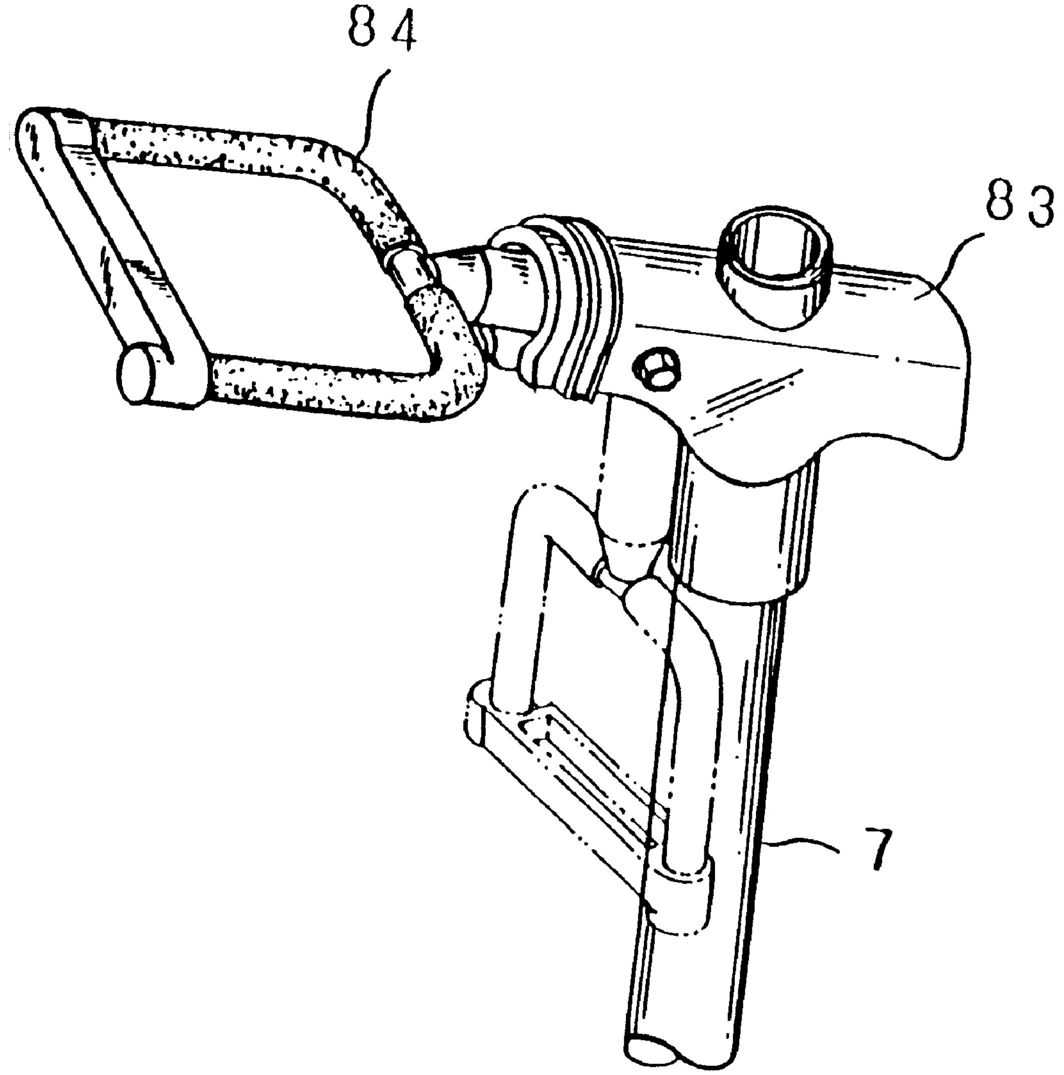
FIG. 10 is a perspective assembly view of FIG. 9.
Figure 11:
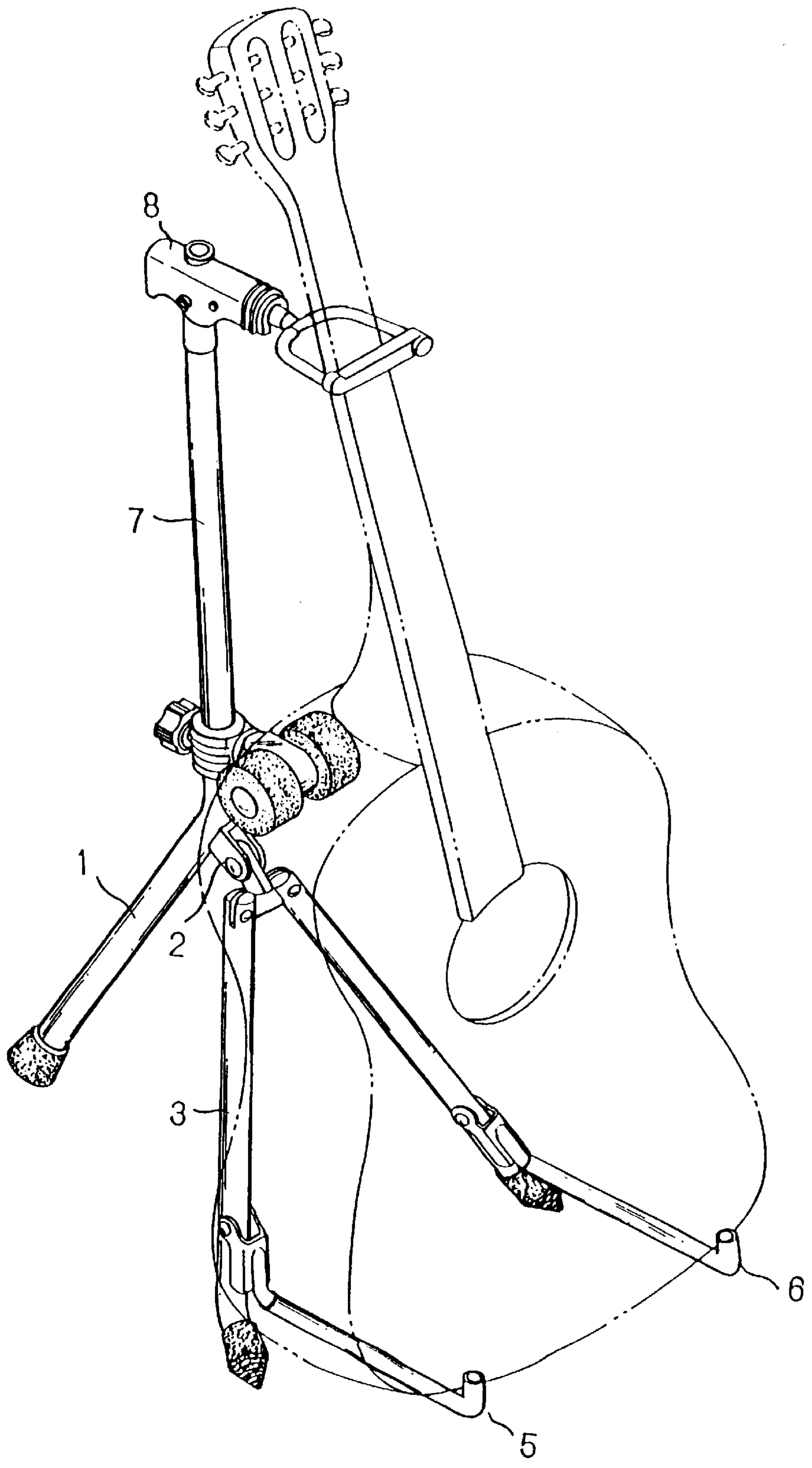
FIG. 11 is a schematic view illustrating an application of a guitar stand of a second preferred embodiment in accordance with the present invention.
Figure 12:
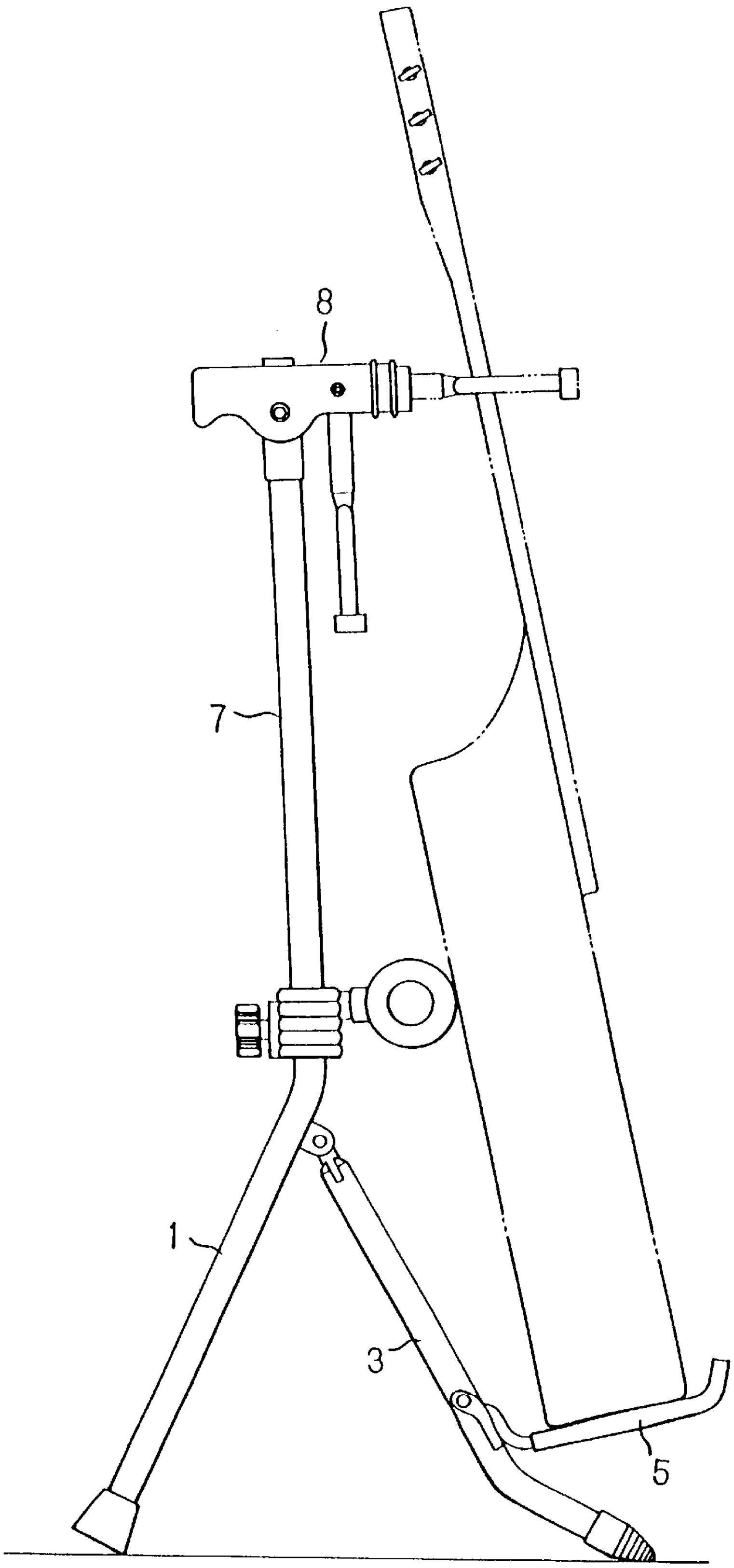
FIG. 12 is another schematic view illustrating an application of a guitar stand of a second preferred embodiment in accordance with the present invention.
Figure 13:
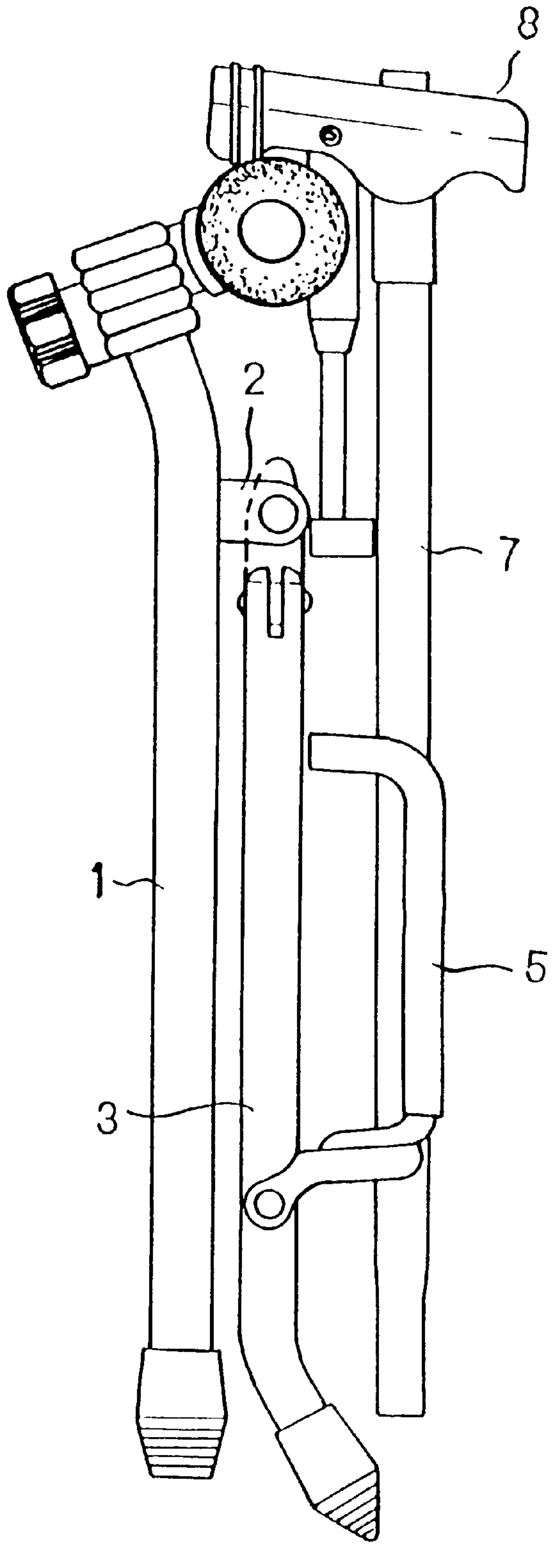
FIG. 13 is a schematic view illustrating a folding of a guitar stand of ,a second preferred embodiment in accordance with the present invention.

Referring to FIGS. 9 to 13, another foldable support frame 8 has a T-shaped joint 83 and a brace 84.

The brace 84 has a shaft 841, a U-shaped plate 842 connected to the shaft 841, and an elastic plate 843 disposed on the U-shaped plate 842.

The T-shaped joint 83 has a sleeve 831 receiving the tube 7, a shaft socket 832 engaging with the sleeve 831 to receive the shaft 841, a first lower curved portion 837, and second lower curved portion 838. The sleeve 831 has a circular hole 836. The shaft socket 832 has a distal flange 833 and a periphery flange 834. A U-shaped elastic clamp 835 encloses the periphery flange 834.

The present invention is not limited to the above embodiment but various modification thereof may be made. Furthermore, various changes in form and detail may be made without departing from the scope of the present invention.

I claim:

1. A guitar stand comprising:

a first leg, a second leg, a fir bracket, a second bracket, a third leg, a connecting seat, a connector, a tube, and a foldable support frame, the third leg having an upper end, the first leg having a first end joint having a first slot, the second leg having a second end joint having a second slot, the first bracket having a first mount disposed on the first leg, the second bracket having a second mount disposed on the second leg, the connecting seat having a U-shaped frame disposed on the third leg, the U-shaped frame having a treaded through aperture, a T-shaped plate inserted in the U-shaped frame, the first slot, and the second slot, and a screw rod fastening the T-shaped plate and the U-shaped frame via the thread through aperture, the connector having a collar receiving the upper end of the third leg, a T-shaped block connected to the collar, and two annular cushions disposed on the T-shaped block, the collar having a round hole receiving a threaded button, the tube inserted through the collar and inserted in the third leg, and the foldable support frame disposed on the tube, wherein the foldable support frame has a support block having a shaft socket and an insertion post inserted in the tube, and a fastening device has a shaft inserted in the shaft socket, a U-shaped plug disposed on the shaft an oblong socket receiving the U-shaped plug, the oblong socket having a first oblong bole and a second oblong hole, a first arc plate inserted through the first oblong hole, and a second arc plate inserted through the second oblong hole.

2. A guitar stand comprising;

a fist leg, a second leg, a first bracket, a second bracket, a third leg, a connecting seat, a connector, a tube, and a foldable support frame, the third leg having an upper end, the first leg having a first end joint having a first slot, the second leg having a second end joint having a second slot, the first bracket having a first mount disposed on the first leg, the second bracket having a second mount disposed on the second leg, the connecting seat having a U-shaped frame disposed on the third leg, the U-shaped frame having a threaded through aperture, a T shaped plate inserted in the U-shaped frame, the first slot, and the second slot, and a screw rod fastening the T-shaped plate and the U-shaped frame via the threaded trough aperture, the connector having a collar receiving the upper end of the third leg, a T-shaped block connected to the collar, and two annular cushions disposed on the T-shaped block, the collar having a round hole receiving a threaded button, the tube inserted through the collar and inserted in the third leg, and the foldable support frame disposed on the tube, wherein the foldable support frame has a T-shaped joint and a brace, the brace has a shaft, a U-shaped plate connected to the shaft, and an elastic plate disposed on the U-shaped plate, and the T-shaped joint has a sleeve receiving the tube, and a shaft socket with the sleeve to receive the shaft.

* * * * *